United States Patent
Lin et al.

(10) Patent No.: US 10,430,689 B2
(45) Date of Patent: Oct. 1, 2019

(54) TRAINING A CLASSIFIER ALGORITHM USED FOR AUTOMATICALLY GENERATING TAGS TO BE APPLIED TO IMAGES

(71) Applicant: Adobe Inc., San Jose, CA (US)

(72) Inventors: Zhe Lin, Fremont, CA (US); Stefan Guggisberg, Basel (CH); Jonathan Brandt, Santa Cruz, CA (US); Michael Marth, Basel (CH)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/680,282

(22) Filed: Aug. 18, 2017

(65) Prior Publication Data

US 2017/0364773 A1 Dec. 21, 2017

Related U.S. Application Data

(63) Continuation of application No. 14/747,877, filed on Jun. 23, 2015, now Pat. No. 9,767,386.

(51) Int. Cl.
*G06K 9/00* (2006.01)
*G06K 9/62* (2006.01)

(52) U.S. Cl.
CPC ....... *G06K 9/6256* (2013.01); *G06K 9/00724* (2013.01); *G06K 9/6262* (2013.01)

(58) Field of Classification Search
CPC . G06K 9/00677; G06K 9/4671; G06K 9/6228
USPC ....... 382/156, 157, 159, 165, 170, 209, 224, 382/278; 128/925; 706/15, 25
See application file for complete search history.

(56) References Cited

U.S. PATENT DOCUMENTS

| | | | |
|---|---|---|---|
| 6,473,535 B1 | 10/2002 | Takaoka | |
| 6,727,942 B1 | 4/2004 | Miyano | |
| 7,020,330 B2 * | 3/2006 | Schroder | H04N 1/6072 358/453 |
| 7,555,165 B2 | 6/2009 | Luo | |
| 7,593,602 B2 * | 9/2009 | Stentiford | G06F 16/58 382/305 |
| 7,715,597 B2 | 5/2010 | Costache | |

(Continued)

OTHER PUBLICATIONS

Fotolia, Sell and Buy Royalty—Free Photos, Images, Vectors and Videos, https://us.fotolia.com, accessed Jun. 25, 2015, 3 pages.

(Continued)

*Primary Examiner* — Yosef Kassa
(74) *Attorney, Agent, or Firm* — Kilpatrick Townsend & Stockton LLP

(57) ABSTRACT

This disclosure relates to training a classifier algorithm that can be used for automatically selecting tags to be applied to a received image. For example, a computing device can group training images together based on the training images having similar tags. The computing device trains a classifier algorithm to identify the training images as semantically similar to one another based on the training images being grouped together. The trained classifier algorithm is used to determine that an input image is semantically similar to an example tagged image. A tag is generated for the input image using tag content from the example tagged image based on determining that the input image is semantically similar to the tagged image.

19 Claims, 8 Drawing Sheets

(56) References Cited

U.S. PATENT DOCUMENTS

| | | | |
|---|---|---|---|
| 7,747,495 B2* | 6/2010 | Malaney | G06Q 10/00 358/1.15 |
| 7,864,990 B2 | 1/2011 | Corcoran | |
| 7,899,887 B2* | 3/2011 | Conn | G06Q 10/10 709/219 |
| 7,920,528 B2* | 4/2011 | Karaoguz | H04L 63/0492 370/338 |
| 8,140,584 B2 | 3/2012 | Guha | |
| 8,176,004 B2* | 5/2012 | Malaney | G06Q 10/00 707/608 |
| 8,335,355 B2* | 12/2012 | Costache | G06F 17/30259 382/118 |
| 8,340,405 B2 | 12/2012 | Cooper | |
| 8,480,471 B2* | 7/2013 | Lutnick | G07F 17/32 463/16 |
| 8,612,971 B1* | 12/2013 | Fitzgerald | G06F 9/45533 718/1 |

OTHER PUBLICATIONS

Behance, Online Portfolios on Behance, https://www.behance.net, accessed Jun. 26, 2015, 3 pages.

Flickr, A Yahoo Company, Flickr—Photo Sharing, The Home for All Your Photos, https://www.flickr.com, accessed Jun. 26, 2015, 3 pages.

Adobe, Adobe Experience Manager Assets on Demand, Release Notes, http://docs.adobe.com/docs/en/aod/overview/release-notes.html, Feb. 23, 2015, 5 pages.

Alex Krizhevsky, et al., ImageNet Classification with Deep Convolutional Neural Networks, Neural Information Processing System, 2012, 9 pages.

Notice of Allowance from related U.S. Appl. No. 14/747,877 dated May 17, 2017, 9 pages.

* cited by examiner

TRAINING A CLASSIFIER ALGORITHM USED FOR AUTOMATICALLY GENERATING TAGS TO BE APPLIED TO IMAGES

CROSS-REFERENCE TO RELATED APPLICATIONS

This is a continuation application of and claims priority to application Ser. No. 14/747,877, filed Jun. 23, 2015, now allowed, which is incorporated herein by reference in its entirety.

TECHNICAL FIELD

This disclosure relates generally to computer-implemented methods and systems and more particularly relates to training a classifier algorithm used for automatically generating tags to be applied to images.

BACKGROUND

An asset management system may create or modify image tags that describe some aspect of the images (e.g., the subject matter, location, time period, etc.). One way of automatically applying a tag to an image is to find a semantically similar image with one or more tags (e.g., an image that depicts similar shapes, spatial relationships, colors, and other visual content) and apply the tags from the semantically similar image to the untagged image. For example, FIG. 1 depicts a sample image 102 of a person kicking a football. The sample image 102 has a tag 104 stating "football game." An automatic tagging process 108 uses the sample image 102 to add a tag to an input image 106. For example, the tagging process 108 can determine that both the sample image 102 and the input image 106 depict a person with a football and, based on that determination, modify the input image 106 to create a tagged image 106' having the tag 110 with the same content (i.e., "football game") as the tag 104.

To identify semantically similar images, classifier algorithms, such as neural network algorithms, can be used to classify different images as being semantically similar to one another. To accurately classify different images, the classifier algorithm is "trained" to recognize certain semantic content (e.g., content in a set of training images depicting trees) and associate that semantic content with a class (e.g., a class labeled "trees"). Through this training process, the classifier algorithm learns which semantic features should be used to assign images to a given class. For example, even though an image of a palm tree and an image of pine tree may depict different shapes (e.g., the shape of the leaves, the color of the tree trunk, etc.), if a classifier algorithm is instructed that both images belong to the "trees" class, the classifier algorithm can learn to identify which semantic features (e.g., a tree trunk with leaves on top) should be used to assign other images to the "tree" category.

Image tags can provide the classes to be used by a classifier algorithm. In a simplified example, a set of fifty training images may include forty images with a tag "dog" and ten images with the tag "boat." The classifier algorithm may learn that certain semantic content (e.g., four legs and a tail) included in the subset of forty images should be associated with the "dog" tag and that certain semantic content (e.g., a sail) included in the subset of ten images should be associated with the "boat" tag. If an untagged image of a boat is later received, the trained classifier algorithm can determine that the image should be associated with the "boat" tag.

Using a small set of training images can present disadvantages. If a set of training images is too small, the classifier algorithm will not learn how to properly classify certain types of semantic content. For example, images of buildings or fish may not have semantic features in common with images of boats and dogs. Thus, a classifier algorithm may not be able to accurately classify images of buildings or fish. Another disadvantage is that the small number of tags may prevent the classifier algorithm from learning how to classify images into more descriptive categories. For example, images of sailboats and aircraft carriers may both be classified as "boats" even though these images include very different types of semantic content.

The accuracy of a classifier algorithm may be improved by using a large set of training images with large numbers of tags. However, training a classifier algorithm using very large sets of tagged training image may be computationally infeasible. For example, a database of images may include millions of images, with each image having thirty or more tags, which results in millions of images with thousands of tags. A computing device that executes a classifier algorithm may have insufficient processing power, storage, or other computing resources that are required to train the classifier algorithm how to classify millions of images using classes defined by thousands of tags.

It is therefore desirable to enable a classifier algorithm that is used for image tagging to be trained using large sets of training images and their associated tags.

SUMMARY

According to certain embodiments, systems and methods are provided for automatically selecting tags to be applied to an input image based on the semantic content of the input image. In some embodiments, a computing device groups training images together based on the training images having similar tags. For example, the computing device can group a set of training images together if the training images have sets of tags with similar content. Thus, training images being assigned to a certain group indicates a similarity among tags associated with the grouped training images. After grouping a set of training images, the computing device trains a classifier algorithm to identify the grouped training images as semantically similar to one another based on the training images being grouped together. For example, the classifier algorithm knows that the training images are semantically similar because the training images are grouped together. The classifier algorithm identifies certain semantic features of the grouped training images that are similar among the group of training image. Using the membership in a group, rather than the tags of individual images, to train the classifier algorithm can reduce the processing resources required for training the classifier algorithm.

After being trained using these groups of training images, the classifier algorithm uses the learned semantic features to determine whether other images are semantically similar to one another for purposes of auto-tagging. For example, the trained classifier algorithm may use sets of semantic features learned during the training stage to match an input image to a semantically similar tagged image. Based on this match between the input image and the tagged image, the computing device generates one or more tags for the input image using one or more tags from the semantically similar tagged image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings, where.

DETAILED DESCRIPTION

Figure 1:
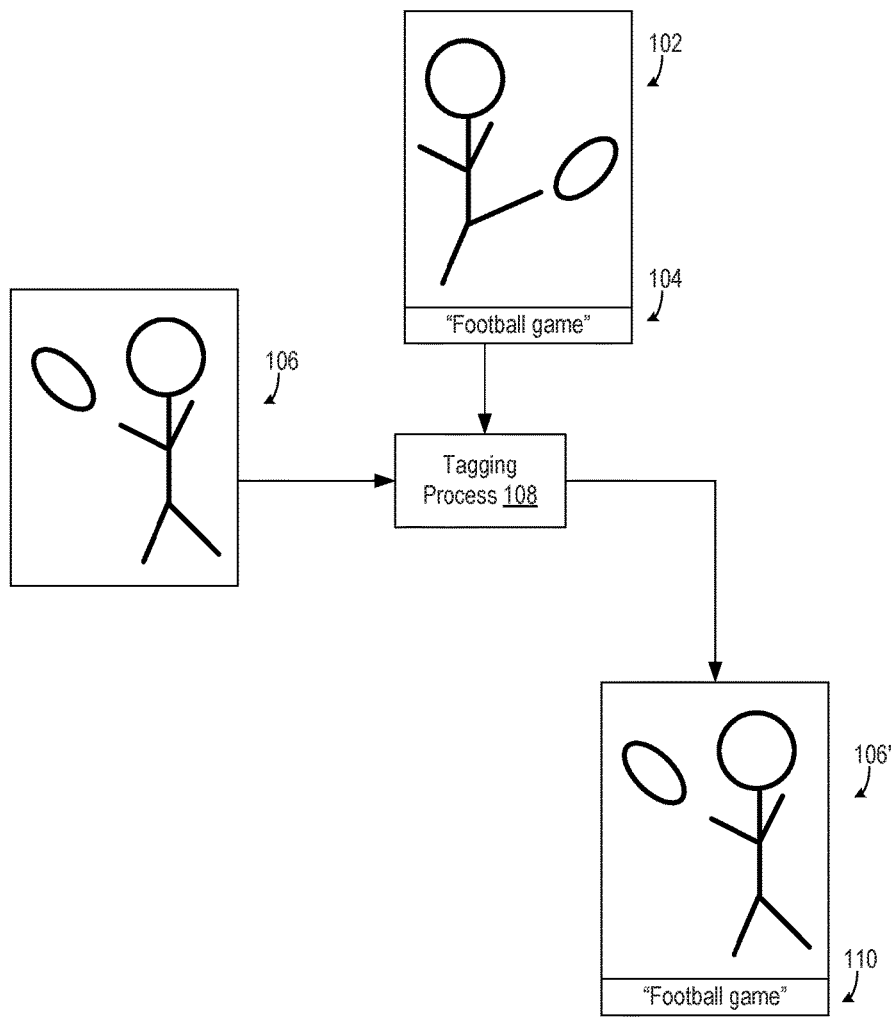
FIG. 1 is a block diagram depicting an example of applying tags to an input image from a semantically similar image.

Embodiments are disclosed for training classifier algorithms that are used for automatically selecting tags to be applied to an input image. These embodiments involve dividing set of training images into groups based on the grouped training images having similar tags, then training a classifier algorithm to identify the training images in each group as being semantically similar to one another. These embodiments can allow a classifier algorithm to be trained using large sets of tagged training images and large numbers of tags even if a computing system that executes the classifier algorithm has limited processing resources. After training the classifier algorithm that certain sets of semantic features should be used to match semantically similar images to one another, the trained classifier algorithm can match untagged input images to semantically similar tagged images. The tags of the tagged images can be used to generate tags for the input image.

In previous solutions, a computing system may lack sufficient processing power to train a neural network or other classifier algorithm to assign semantic content from millions of images into millions of individual classes represented by individual tags. For example, in a set of sixteen million training images, each image may have multiple tags. Thus, a large set of training images may have up to two million tags, each of which may represent a separate "class" that may be used by a classifier algorithm. A computing device may lack the processing power required for training a neural network classifier to analyze the semantic content for each of the sixteen million images and assign the analyzed semantic content to one or more of the two million available classes.

These challenges can be addressed by embodiments disclosed herein. For example, an asset management application can sub-divide a large set of tagged training images into groups. Each group can include training images that have similar numbers of tags, where the tags used to select the grouped image have similar content and occur with similar frequencies in the full set of tagged training images. For example, a first image may have a tag labeled "dog" and another tag labeled "bus," and a second image may have a tag labeled "wolf" and another tag labeled "helicopter." The tags "dog" and "wolf" may be associated with similar numbers of training images throughout the full set of tagged training images, and the tags "bus" and "helicopter" may likewise occur with similar frequency in the set of tagged training images. The first and second images can be assigned to the same group. Assigning the images to the group can be used to indicate that the images should be considered similar to one another (i.e., that the images belong to the same class).

After the groups are generated, a neural network or other classifier algorithm can analyze the semantic content of images within each group to learn which semantic features should be associated with a class represented by the group. For example, an image of a wolf running toward a red bus and an image of a basset hound on the hood of a car may be grouped together based on their tags (e.g., "wolf," "bus," "hound," "car"). The classifier algorithm can be trained to recognize these images as being semantically similar to one another because both images are in the same group (i.e., images with tags indicating dogs with vehicles). Training the classifier algorithm using the group may require fewer computing resources than training the classifier algorithm using the entire set of training images and their associated tags because the number of images in a group is smaller and the number of classes to which a given image may be assigned is smaller.

After training the classifier algorithm, the trained classifier algorithm can be used to accurately identify semantic similarities between untagged images and examples of tagged images. For example, because the classifier algorithm has been trained to match images together if the images include dogs and vehicles, the trained classifier algorithm can match an untagged image of a poodle on a bus with a tagged image of a beagle chasing a car. The tagged image may include the tag "dog chasing car." Based on the image-matching performed by the trained classifier algorithm, one or more tags (e.g. "dog" and "car") can be automatically generated for the untagged image using the tags of the semantically similar tagged image.

In some embodiments, a classifier algorithm can be trained using a publicly available set of training images and then provided to a private asset management system. For example, a server system with more processing power may be used to train a neural network or other classier algorithm using tagged images from an online image-sharing service. After training the neural network, the server system provides the trained neural network model to a computing system that manages private image assets. The computing system can use the trained neural network to match untagged images to tagged images. The matching can be used to automatically generate tags for the untagged images. In some embodiments, the computing system can receive updates to the trained neural network from the server system (e.g., via an online subscription service). In additional or alternative embodiments, a private computing system that receives the trained neural network or other classifier can provide tags for training images to the server system. These user-provided tags may be used to further train the neural network or other classifier.

As used herein, the term "image" refers to any electronic data that includes graphical content that may be rendered for display at a display device. In some embodiments, an image may be a photograph. In additional or alternative embodiments, an image may be one or more frames selected from a video. In additional or alternative embodiments, an image may be a drawing. A set of tagged training images may include any combination of photographs, video frames, drawings, and the like.

As used herein, the term "tag" is used to refer to metadata that is included in or otherwise associated with an image and that describes or otherwise indicates some attribute of the image. Examples of tags include (but are not limited to) descriptions of subject matter depicted in the images, authors of images, editors of images, time periods associated with images (e.g., creation date, modification date, etc.), locations associated with or depicted in images, etc.

As used herein, the term "semantic similarity" is used to refer to similarity between aspects of image content that are visible to a user. In some embodiments, semantic similarity includes a similarity between a first set of shapes and spatial relationships in a first image and a second set of shapes and spatial relationships in a second image. In one example, an image of a person's face has a higher semantic similarity to an image of another person and a lower semantic similarity to an image of a building. In another example, an image of two people standing close together has a higher semantic similarity to an image of a crowd of people and a lower semantic similarity to an image of a single person. In additional or alternative embodiments, semantic similarity includes a similarity between a first image style in a first image and a second image style in a second image. For example, vectors representing color or contrast information can be calculated for two images. The stylistic similarity can be determined by calculating a distance between these vectors. A larger calculated distance indicates a lower degree of stylistic similarity, and a smaller calculated distance indicates a higher degree of stylistic similarity.

In some embodiments, information about tags associated with training images is represented using tag vectors. As used herein, the term "tag vector" is used to refer to a vector having a set of numerical values that conveys information about one or more tags associated with an image. In some embodiments, if an element of a tag vector has a zero value, then a certain tag from a set of available tags is not associated with the image. If an element of the tag vector has a non-zero value, then a certain tag from a set of available tags is associated with the image. For example, a tag vector [0, 1, 1, 0] may indicate that the first and fourth tags from a set of available tags are not associated with an image and that the second and third tags from the available tag set are associated with an image. In additional or alternative embodiments, non-zero values in the tag vector convey additional information. For example, the element values in the tag vector may indicate how frequently a given tag occurs within a set of images, the prominence of the tag within a given image, etc.

As used herein, the term "classifier algorithm" is used to refer to an algorithm executed by one or more processing devices that identifies one or more associations between the semantic content of an image and a class of semantically similar images. For example, a classifier algorithm may analyze training images with certain recurring objects, color schemes, or other semantic content and determine that the objects, color schemes, or other semantic content are indicative of a certain class of content (e.g., "dogs," "vehicles," "trees," etc.). The classifier algorithm may apply the learned associations between different classes and different types of semantic content to classify subsequently received images. An example of a classifier algorithm is an algorithm that uses a neural network model to identify associations between certain semantic features and certain classes of semantic content.

In some embodiments, a classifier algorithm uses one or more feature vectors for an image to analyze the semantic content of the image. As used herein, the term "feature vector" is used to refer to a vector having a set of numerical values that conveys information about one or more semantic features of an image. For example, elements of a feature vector may have values that indicate that certain objects, color schemes, stylistic elements, or some combination thereof are included in a given image.

Figure 2:
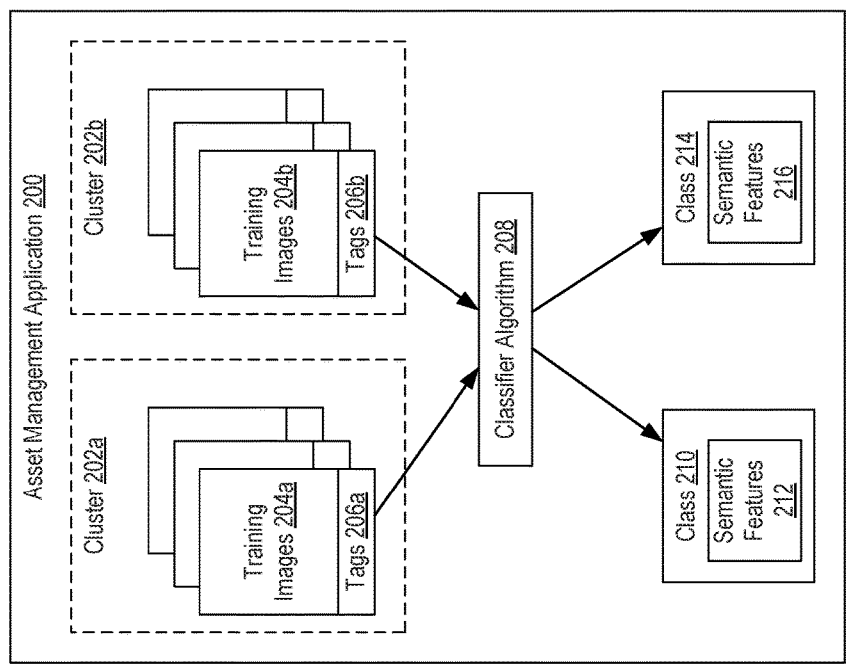
FIG. 2 is a diagram depicting a process flow in which an asset management application uses training images and associated tags to train a classifier algorithm that is used generate tagged images according to certain exemplary embodiments.

Referring now to the drawings, FIG. 2 is a diagram depicting a process flow in which an asset management application 200 uses clusters 202a, 202b of training images 204a, 204b and associated tags 206a, 206b to train a classifier algorithm 208. In a simplified example, the asset management application 200 groups sets of training images 204a, 204b into clusters 202a, 202b. In a training process, the classifier algorithm learns that certain semantic features 212 of a first image can indicate that the image belongs to the class 210 and that other semantic features 216 of a second image can indicate that the image belongs to the class 214. The semantic features 212 associated with the class 210 are identified by analyzing the semantic content of the training images 204a, and the semantic features 216 associated with the class 214 are identified by analyzing the semantic content of the training images 204b.

In some embodiments, a set of semantic features (e.g., certain colors, shapes, spatial relationships etc.) is represented using a feature vector (e.g., numerical values representing shapes, colors, positions, etc.). For example, the classifier algorithm 208 can generate one or more feature vectors representing the semantic features 212, and can also generate one or more additional vectors representing the semantic features 216. After being trained, if the classifier algorithm 208 receives additional images (e.g., an untagged input image and a tagged example image), the classifier algorithm 208 can generate feature vectors for the two images to determine if both images belong to one of the classes 210, 214 (i.e., that the images are semantically similar to one another).

The asset management application 200 and the classifier algorithm 208 include program code executable by one or more processing devices to perform one or more operations described herein. The asset management application 200 may be executed at one or more computing devices, which may be stand-alone computing devices, a set of computing devices configured for cloud computing or other distributed computing, or some combination thereof. (An example of a computing system that can execute the asset management application 200 is described herein with respect to FIG. 9.) In some embodiments, the asset management application 200 is a stand-alone application. In other embodiments, the asset management application 200 includes one or more modules incorporated into another application.

The training images 204a, 204b are included in a set of images that is used by the asset management application 200 to train the classifier algorithm 208. The training images 204a, 204b may include a highly diverse set of semantic content with different associated tags 206a, 206b. For example, the training images 204a, 204b may be a large collection of images (e.g., a set of sixteen million images) that are downloaded or otherwise accessed from a publicly available source, such as an online service that allows subscribers to upload and tag different images.

The tags 206a, 206b can include any type of metadata for the training images 204a, 204b. In some embodiments, the tags 206a, 206b include data that is manually entered by users who have access to the training images 204a, 204b via an online service. In additional or alternative embodiments, the tags 206a, 206b include data that is automatically generated by applications that create, modify, or otherwise use image content. Examples of automatically generated data include (but are not limited to) the name of an author for an image, the name of an entity that has edited the image, a location associated with the image (e.g., where the image was created), a timestamp associated with the creation or modification of the image, etc.

Each of the training images 204a, 204b includes any number of tags 206a, 206b. For example, if the training images 204a, 204b are available via an online image-sharing service, each of the training images 204a, 204b may have relatively large numbers of tags (e.g., thirty to fifty tags per image) contributed by subscribers to the online service.

In some embodiments, the asset management application 200 groups subsets of training images into clusters based on the tags 206a, 206b in the training images 204a, 204b. FIG. 2 depicts examples of clusters 202a, 202b. A first subset of images, which includes the training images 204a, is included in the cluster 202a, and a second subset of images, which includes the training images 204b, is included in the cluster 202b. The cluster 202a is generated based on the tags 206a, and the cluster 202b is generated based on the tags 206b.

Each cluster includes images with similar sets of tags. A set of tags can collectively represent a class of image content. In a simplified example, the cluster 202a may include training images 204a that include the tags "dog" and "vehicle," and the cluster 202b may include training images 204b that include the tags "dog" and "room." The set of tags for the first cluster 202a (e.g., "dog" and "vehicle") therefore corresponds to a class of image content that includes dogs on vehicles. The set of tags for the second cluster 202b (e.g., "dog" and "room") therefore corresponds to a class of image content that includes dogs in rooms.

In some embodiments, the asset management application 200 generates clusters 202a, 202b that represent disjoint classes. Disjoint classes of image content will have tags that do not significantly overlap one another. For instance, in the example above, a first class corresponding to the cluster 202a that includes tags 206a for dogs in vehicles is disjoint from a second class corresponding to the cluster 202b that includes tags 206b for dogs in rooms. Even though the classes overlap with respect to the "dog" tag, the classes do not overlap with respect to the "room" tag. An example of how the asset management application 200 can generate clusters 202a, 202b that represent disjoint classes is described in detail below with respect to FIGS. 6-8.

In some embodiments, the asset management application 200 identifies representative features for each cluster by executing a deep convolutional neural network algorithm or other suitable classifier algorithm 208 that classifies images based on their semantic content. By grouping training images into clusters 202a, 202b using the tags 206a, 206b, the asset management application 200 can obtain subsets of training images that are sufficiently small to train the classifier algorithm 208 with the processing resources available to the asset management application 200. By contrast, executing a deep convolutional neural network algorithm or other classifier algorithm 208 on a large set of images (e.g., a set of fifteen million public images that includes the training images 204a, 204b) may be infeasible due to limitations on processing resources, memory storage, etc.

The asset management application 200 can use the clusters 202a, 202b to identify one or more tags that may be applied to an input image 304 that is received or otherwise accessed by the asset management application 200. In some embodiments, the asset management application 200 selects a cluster having semantic content that is similar to the semantic content of the input image 304. For example, the asset management application 200 may identify one or more semantic features that are representative of a given cluster (e.g., objects that occur in the majority of the cluster's images, color schemes that occur in the majority of the cluster's images, etc.). In some embodiments, the asset management application 200 identifies these representative semantic features by executing a deep convolutional neural network algorithm or other suitable classifier algorithm on each cluster 202a, 202b.

Figure 3:
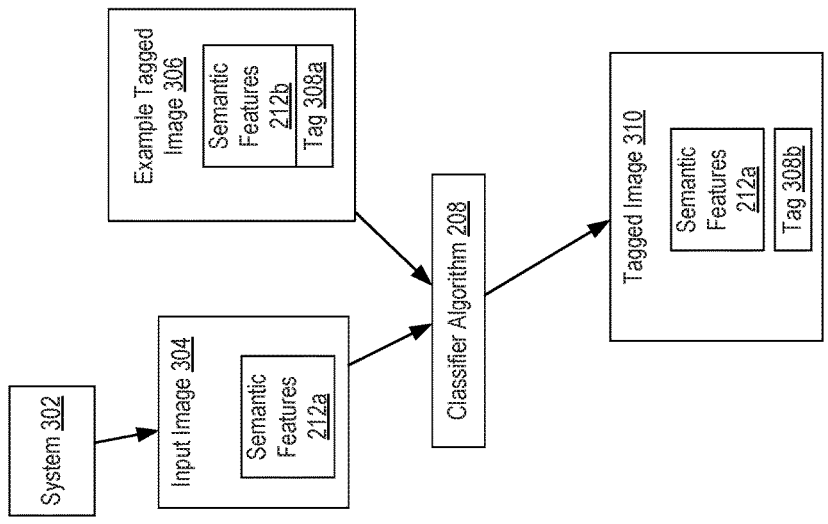
FIG. 3 is a diagram depicting a process flow in which the semantic content of an input image is used to automatically select a tag for a tagged image according to certain exemplary embodiments.

FIG. 3 depicts an example of using a trained classifier algorithm 208 to automatically tag an input image 304. The input image 304 may be received or otherwise accessed by a system 302 and provided to the trained classifier algorithm 208. The trained classifier algorithm 208 determines that the input image 304 has semantic features 212a. The trained classifier algorithm 208 matches the input image 304 to an example tagged image 306 having semantic features 212b and an associated tag 308a. The matching is performed based on the classifier algorithm having previously learned that the class 210 encompasses images having semantic features 212a, 212b.

In some embodiments, the classes 210, 214 can be represented by feature vectors that can be used to match images to one another. For example, a first feature vector may represent the semantic features 212 that are associated with the class 210. The trained classifier algorithm 208 can generate a second feature vector representing the semantic features 212a for the input image 304 and a third feature vector representing the semantic features 212b for the example tagged image 306. The input image 304 can be matched to the example tagged image 306 based on the second and third feature vectors being within a threshold distance of the first feature vector. Based on the matching provided by the classifier algorithm 208, a suitable application (e.g., the asset management application 200) can generate a tag 308b that includes the same or similar content as the tag 308a.

In some embodiments, the classes 210, 214 may simply represent learned similarities among sets of training images 204a, 204b, and may not be directly associated with tags or other labels. For example, the classifier algorithm 208 may be trained using a first system, such as a server that can access publicly available training images 204a, 204b, and the trained classifier algorithm 208 can be outputted or otherwise provided to a second system, such as a private computing system that uses the trained classifier algorithm 208 to classify private sets of images. The private system can execute the trained classifier algorithm 208 to determine that an untagged input image 304 and an example tagged image 306 belong to the same class (e.g., have feature vectors sufficiently close to a learned feature vector representing the class). The private system uses the matching between the example tagged image 306 and the input image 304 to generate a tagged image 310.

In some embodiments, the asset management application 200 or another suitable application automatically applies one or more tags 308b to the input image 304 to generate the tagged image 310. For example, the asset management application 200 or other suitable application may generate the tagged image 310 without requiring input from a user after receiving the input image 304. In additional or alternative embodiments, the asset management application 200 or another suitable application suggests one or more tags to be applied to the input image 304. For example, the asset management application 200 or other suitable application may output a graphical interface with suggestions for one or more tags 308b (e.g., a subset of the tags 206a) that may be suitable for the input image 304. The asset management application 200 or other suitable application may receive input from a user via the graphical interface that selects one or more of the suggested tags. The asset management application 200 or other suitable application applies the selected tags 308b to the input image 304 to generate the tagged image 308b.

In additional or alternative embodiments, the classes 210, 214 identified during the training of the classifier algorithm 208 may be associated with one or more tags or other labels that are applied to subsequently analyzed images. For example, one or more of the tags 206a can be used to generate a tag for the class 210 that encompasses semantic features 212 learned from an analysis of the training images 204a. The generated tags may be applied to subsequently analyzed images having semantic features that are similar to the semantic features 212.

For example, the asset management application 200 may select a cluster 202a based on the semantic features of the input image 304 being similar to the representative semantic features of the cluster 202a or at least some training images within the cluster 202a. The asset management application 200 uses the tags 206a from the selected cluster 202a to identify one or more tags to be applied to the input image 304 wherein generating the tagged image 310. The tags 206a from semantically similar training images 204a may be more likely to accurately describe the sematic content of the input image 304. For example, if the input image 304 depicts dogs on a bus, then the tags 206a that include "dog" and "vehicle" are more likely to accurately describe the input image 304 as compared to the tags 206b from training images 204b that include "dog" and "room." Thus, by grouping the training images 204a, 204b into clusters 202a, 202b and training a classifier algorithm 208 using the clusters 202a, 202b, a subsequently received input image 304 can be accurately assigned to one of the classes 210, 214 that may be used to accurately tag the input image 304.

In some embodiments, the asset management application 200 may select, generate, or otherwise obtain more generic tags that represent the class 210 and that encompass more specific tags applied to individual images in the class. For example, a first image may have a tag labeled "dog" and another tag labeled "bus," and a second image has a tag labeled "wolf" and another tag labeled "helicopter." The asset management application 200 may determine that at least some of the tags "dog" and "wolf" are encompassed by more generic tags (e.g., "animal," "dog") and that at least some of the tags "helicopter" and "bus" are encompassed by more generic tags (e.g., "vehicle"). The asset management application 200 may use a more generic term for the class (e.g., "dogs with vehicles") that includes related training images without those specific tags (e.g., an image tagged with "wolf" and "helicopter").

Figure 4:
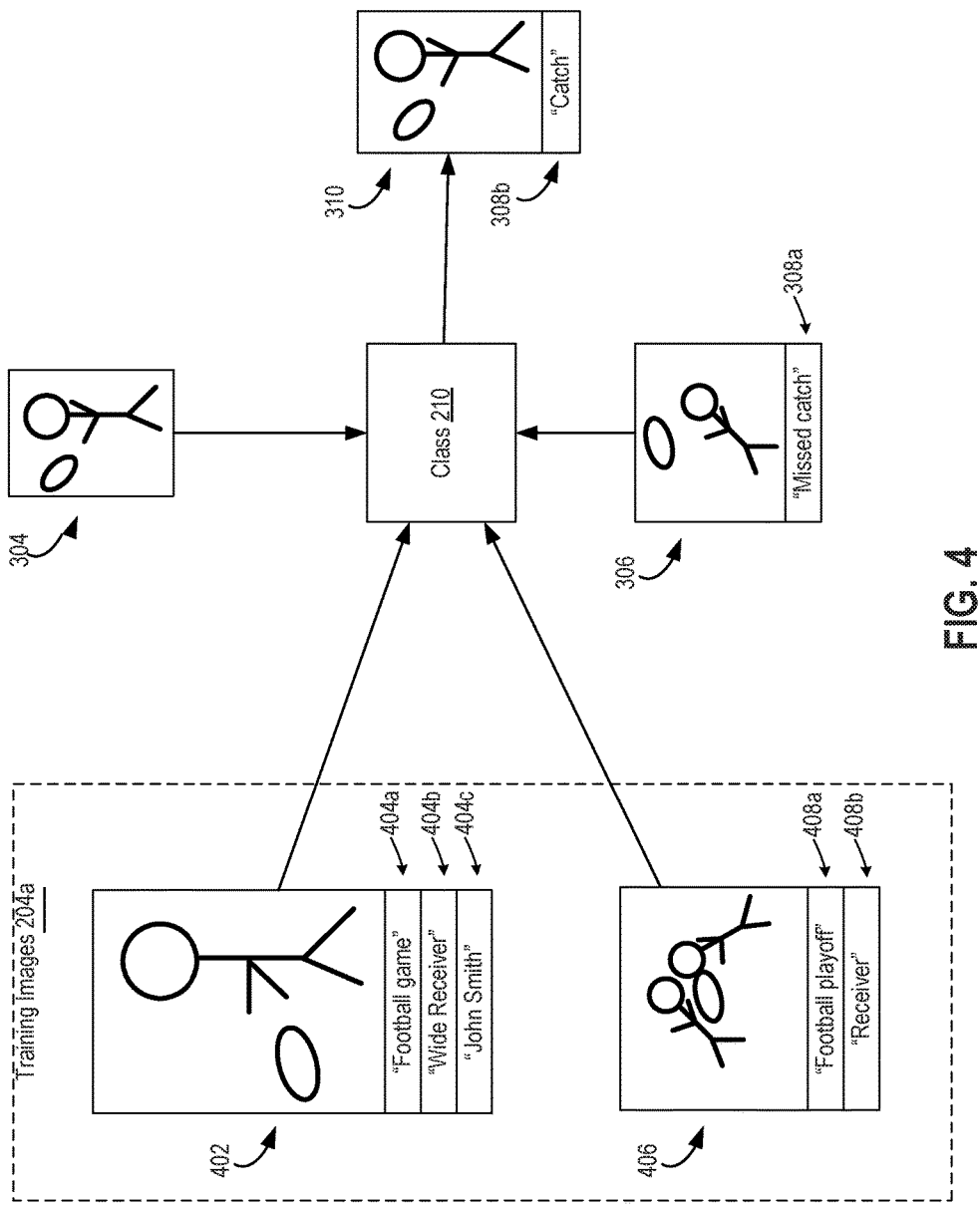
FIG. 4 is a diagram depicting a process flow in which a trained classifier algorithm is used to automatically generate a tag for an input image by matching the input image to an example tagged image according to certain exemplary embodiments.

FIG. 4 is a diagram depicting an example of a process flow in which the semantic content of an input image 304 is used to automatically select a tag 308a from an example tagged image 306 and thereby generate a tagged image 310. In the simplified example depicted in FIG. 4, the training images 204a include the images 402, 406. The image 402 is associated with tags 404a, 404b, 404c and the image 406 is associated with tags 408a, 408b. The asset management application 200 groups the images 402, 406 into the same cluster 202a based on the tags 404a, 408a having the term "football" and the tags 404b, 408b having the term "receiver."

After generating the cluster 202a, the asset management application 200 executes a classifier algorithm 208 to analyze the semantic content of the images 402, 406. Based on the analysis, the asset management application 200 associates certain semantic features of the images 402, 406 with a class 210 based on those images 402, 406 having the tags "football" and "receiver". For example, the asset management application 200 generates a feature vector for each of the images 402, 406 that includes information (e.g., numerical values representing shapes, colors, positions, etc.) indicating that both images depict a football and a person catching the football, and associates those feature vectors with the class 210.

The asset management application 200 uses the learned association between one or more learned feature vectors, which may be associated with a football and a person catching the football imagery, and one or more subsequently generated feature vectors from other images to automatically select tags for an input image 304. For example, the asset management application 200 may compute a feature vector for the input image 304 that indicates that the input image 304 includes an object having the shape and coloring of a football and a person standing upright near the football. The asset management application 200 may also compute a feature vector for the example tagged image 306 that indicates that the example tagged image 306 includes an object having the shape and coloring of a football and a person leaning backward in the path of the football. The asset management application 200 uses the computed feature vectors to associate the input image 304 and the example tagged image 306 with the class 210. The asset management application 200 selects the tags 308b (i.e., "football" and "receiver") based on the input image 304 being matched to the tagged example image 306 via their association with the class 210.

The asset management application 200 generates the tagged image 310 having the tag 308b and the semantic content of the input image 304. The tag 308b can be the same as or similar to the tag 308a from the example tagged image 306. For example, the "catch" portion of the "missed catch" tag 308a can be used in the tag 308b, as depicted in FIG. 4.

The simplified example depicted in FIG. 4 is provided for purposes of illustration. A given cluster may include more than two training images (e.g., over one thousand images). Each training image may be associated with any number of tags (e.g., thirty to fifty tags). A class 210 that corresponds to a given cluster may be defined using multiple tags, as opposed to the simple combination of "football" and "receiver" used in the example of FIG. 4. Furthermore, as explained in greater detail below with respect to FIGS. 6-8, two or more training images may be clustered together using tag vectors representing their respective tags even if the training images do not actually share any tags.

Figure 5:
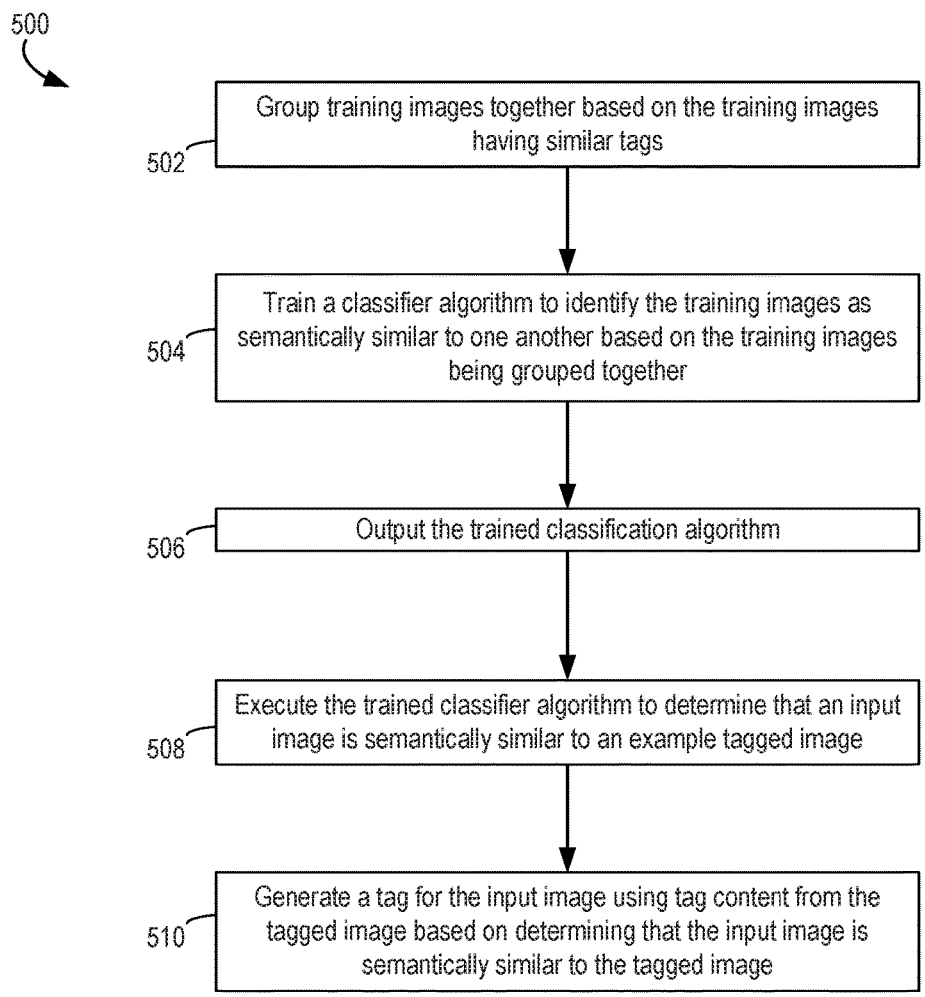
FIG. 5 is a flow chart depicting an example of a process for automatically selecting tags to be applied to an input image based on the semantic content of the input image according to certain exemplary embodiments.

FIG. 5 is a flow chart depicting an example of a process 500 for automatically selecting tags to be applied to an input image based on the semantic content of the input image. For illustrative purposes, the process 500 is described with reference to the implementation depicted in FIGS. 2-4. Other implementations, however, are possible.

The process 500 involves grouping training images together based on the training images having similar tags, as depicted in block 502. For example, the asset management application 200 may be executed by a suitable processing device to training images 204a, 204b. The training images 204a, 204b may be accessed from a database or other suitable data structure that is stored on a non-transitory computer-readable medium accessible to the asset management application 200. In some embodiments, the asset management application 200 groups the training images 204a, 204b into clusters 202a, 202b. In one example, a first cluster 202a includes the training images 204a having one or more tags corresponding to a first class of tags (e.g., "dog" and "vehicle"), and a second cluster 202a includes the training images 204a having one or more tags corresponding to a second class of tags (e.g., "dog" and "room"). In some embodiments, the asset management application 200 also groups the training images into clusters based on the training images in each cluster having tags with similar rates of occurrence within the larger set of tagged training images.

The asset management application 200 can determine the similarity of different tag content in any suitable manner. In some embodiments, the asset management application 200 identifies each tag for a given image and determines that at least a portion of the tag is identical to a portion in each other tag. For example, the asset management application 200 may determine that tags with different phrases (e.g., "football season," "football game," "football playoff") include similar tag content based on each phrase including a common word (e.g. "football.")

In some embodiments, the asset management application 200 identifies relevant portions of tag content to compare tags with one another. For example, the asset management application 200 may perform one or more operations such as stemming the tag content, removing irrelevant words from the tag content, tokenizing the tag content, determining n-grams for the tag content, or some combination of these or other operations. Stemming includes converting words and phrases to their root form. Examples of stemming include converting a plural version of a word or phrase ("apples") to a singular version of the word ("apple"), converting a possessive version of a word or phrase ("Denny's") to a non-possessive version of a word or phrase ("Denny"), etc. Removing irrelevant words includes removing stop words or words without any semantic relationship to other words, such as prepositions or adjectives that are not used to identify a given entity. For example, the word "of" may be relevant in the phrase "Joan of Arc" and may be irrelevant in the phrase "top of a hill." Tokenization includes parsing or otherwise splitting text into elements. An element can be a word, such as a proper name, or a phrase, such as a noun coupled with an adjective (e.g., "mad scientist"). Determining n-grams can include identifying a contiguous sequence of n items from a given sequence of text or speech. An n-gram could be any combination of letters, words, numbers, etc. Examples of n-gram include unigrams having a single word, bigrams having two words, etc.

In some embodiments, the asset management application 200 uses tag vectors for the training images 204a, 204b to generate the clusters 202a, 202b. In some embodiments, a tag vector for a given image is an M-dimensional vector that indicates which tags from a set of M available tags are applied to or otherwise associated with the image. In a simplified example, the entire set of images that includes the training images 204a, 204b may include five tags, and each image may be associated with at least one of those five tags. A tag vector for each image can have five elements. Each element can have a value that indicates that the tag is present in the image or absent from the image. For example, if the set U of M=5 available tags includes tags $\{u_1, u_2, u_3, u_4, u_5\}$ and a given image is associated with tags $u_1$ and $u_2$ (but not any other tag in the set U), then the corresponding tag vector for the image may be $\{x_1, x_2, 0, 0, 0\}$, where $x_i$ is a value that indicates that the tag $u_i$ is associated with the image.

The value $x_i$ may also indicate rates of occurrence for a given tag $u_i$ within the set of tagged training images. For example, the value $x_i$ may be calculated using the number of images in a set of tagged training images that include or are otherwise associated with the tag $u_i$. The rate of occurrence of the tag $u_i$ can indicate that the tag conveys information that is more or less helpful for understanding the semantic content of an image. For instance, tags that occur in nearly every image may convey less information about a given image or a given set of images with similar semantic content. By contrast, a set of tags that occur less frequently throughout a set of tagged training images may be more likely to convey information that is specific to a given type of semantic content. The asset management application 200 may use these rates of occurrence to select certain sets of tags for grouping training images into clusters. (Additional details are provided below with respect to FIGS. 6-8 regarding how the asset management application 200 uses the rates of occurrence for different tags to group subsets of training images together.)

The M-dimensional tag vectors for the training images can represent points corresponding to different training images in an M-dimensional space. In some embodiments, different portions of the M-dimensional space are used to group the training images corresponding to tag vectors into clusters. For example, a first cluster may correspond to a first portion of the M-dimensional space that includes the points represented by tag vectors generated from the tags 206a of the training images 204a. A second cluster may correspond to a second portion of the M-dimensional space that includes the points represented by tag vectors generated from the tags 206b of the training images 204b.

The process 500 also involves training a classifier algorithm to identify the training images as semantically similar to one another based on the training images being grouped together, as depicted in block 504. The asset management application 200 is executed by one or more processing devices to train the classifier algorithm 208 to classify the semantic content of each cluster into a given class encompassing certain semantic features. For example, the asset management application 200 may be executed by a suitable processing device to classify the semantic content of each of the clusters 202a, 202b. The asset management application 200 may classify the semantic content of the cluster 202a into the class 210 by identifying one or more semantic features 212 that are representative of the training images 204a. The asset management application 200 may also classify the semantic content of the cluster 202b into the class 214 by identifying one or more semantic features 216 that are representative of the training images 204b.

In some embodiments, the asset management application 200 executes a neural network classifier algorithm to associate semantic content from images in a cluster with a given class encompassing certain semantic features. To execute the neural network classifier algorithm, the asset management application 200 uses the subset of training images in the cluster as inputs and excludes at least some training images that are not grouped into the cluster from consideration by the neural network classifier algorithm. Limiting the neural network classifier algorithm to the training images in a cluster can allow the asset management application 200 to accurately classify semantic content corresponding to a representative set of tags utilizing limited processing resources.

In some embodiments, a set of tags represents a class of semantic content for the cluster. The asset management application 200 may identify a set of tags as being representative of a cluster in any suitable manner. In some embodiments, the asset management application 200 generates a histogram of occurrences of the tags within the training images of a cluster. The asset management application 200 selects tags having a sufficiently large or sufficiently small number of occurrences (e.g., the top ten most or least frequent tags) as a set of tags that represents the cluster. In additional or alternative embodiments, the asset management application 200 may select tags having the smallest or largest value of $x_i$ (e.g., the top ten or bottom ten values of $x_i$) as the set of representative tags.

In some embodiments, process 500 also involves outputting the trained classifier algorithm, as depicted in block 506. For example, the asset management application 200 may generate a software package that includes the trained classifier algorithm 208. A computing system that executes the asset management application 200 can transmit the software package to a separate computing system, such as a computing system communicatively coupled to a private asset management system. The computing system that receives the software package with the trained classifier algorithm 208 can execute the trained classifier algorithm 208 to determine similarities between private input images 304 and example tagged images 306. In some embodiments, the example tagged images 306 can be included in or obtained from the training images 204a, 204b. In additional or alternative embodiments, the example tagged images 306 can be included in a private set of tagged images that is separate from a publicly available set of training images 204a, 204b that is used by the asset management application 200 to train the classifier algorithm.

In some embodiments, blocks 508 and 510 can be executed by a computing system that receives the trained classifier algorithm 208 that is outputted at block 506. In other embodiments, block 506 can be omitted, and the same system that trains the classifier algorithm 208 can subsequently use the classifier algorithm to automatically generate or suggest tags for images.

The process 500 also involves executing the trained classifier algorithm to determine that an input image is semantically similar to an example tagged image, as depicted in block 508. The trained classifier algorithm 208 is executed by one or more processing devices to analyze the semantic content from an input image 304 and determine that the analyzed semantic content is similar to the semantic content of one or more example tagged images 306.

In some embodiments, the classifier algorithm 208 selects a semantic feature that is representative of the input image 304. The classifier algorithm 208 uses the semantic feature to search for images in a set of example tagged images 306 having similar semantic features. The classifier algorithm 208 identifies at least one example tagged image 306 that is semantically similar to the input image 304.

In some embodiments, the trained classifier algorithm 208 matches the input image 304 to the example tagged images 306 based on the feature vectors. For example, the classifier algorithm 208 may generate one or more input feature vectors for the input image 304. The trained classifier algorithm 208 compares an input feature vector of the input image 304 with features vectors for one or more example tagged images 306. The trained classifier algorithm 208 selects one or more example tagged images 306 based on a degree of similarity determined using the comparison. The degree of similarity between an example tagged image 306 and an input image 304 can indicate that one or more tags from the example tagged image 306 are more likely to accurately describe the content of the input image 304.

In some embodiments, the classifier algorithm 208 determines a degree of similarity by determining a distance between feature vectors for a cluster and an input image. For example, the classifier algorithm 208 may determine that a distance between a feature vector for a first example tagged image 306 and an input feature vector for the input image 304 is less than a threshold distance used for determining similarity. A sufficiently small distance (i.e., below the threshold distance) can indicate that the semantic content of the input image 304 is similar to the semantic content of the first example tagged image 306. Therefore, the classifier algorithm 208 selects the first example tagged image 306 based on the determined distance. Conversely, the classifier algorithm 208 may determine that a distance between a feature vector for a second example tagged image 306 and an input feature vector for the input image 304 is greater than a threshold distance. A sufficiently large distance (i.e., above the threshold distance) can indicate that the semantic content of the input image 304 is insufficiently similar to the semantic content of the second example tagged image 306.

In some embodiments, the classifier algorithm 208 uses one or more inputs received from a user to select one or more features of the input image 304 for comparison to the clusters 202a, 202b. For example, the classifier algorithm 208 may present the input image 304 in a graphical interface. Inputs received to the graphical interface may indicate a portion of the input image 304 (e.g., a particular object in the image) that is to be tagged. The classifier algorithm 208 computes an input feature vector for the selected feature. The classifier algorithm 208 selects one or more semantically similar clusters using a comparison of the computed input feature vector and feature vectors for training images in the clusters.

The process 500 also involves generating a tag for the input image using tag content from the tagged image based on determining that the input image is semantically similar to the tagged image, as depicted in block 510. For example, one or more processing devices execute an asset management application 200 or another suitable application to identify one or more tags 308a that are associated with one or more example tagged images 306 that have been matched to an input image 304 using the trained classifier algorithm 208. The asset management application 200 or other suitable application generates one or more tags 308b having content that is the same as or similar to the tags 308a from the example tagged image 306. The asset management application 200 or other suitable application generates a tagged image 310 that is associated with the generated tag 308b. In some embodiments, the asset management application 200 modifies metadata of the input image 304 to generate the tagged image 310 with the tags 308b. In additional or alternative embodiments, the asset management application 200 generates a copy of the input image 304 that will be the tagged image 310 and modifies the metadata for the newly created image 310 to include one or more tags 308b.

The asset management application 200 can perform any suitable process for selecting the tags to be applied to the input image 304. In some embodiments, the asset management application 200 can select a subset of tags 308a from the example tagged images 306 that are most semantically similar to the input image 304. If one of the example tagged images 306 has a sufficiently high semantic similarity to the input image 304, each tag associated with the tagged image 306 may be applied to the input image 304 to generate the tagged image 310. In additional or alternative embodiments, the asset management application 200 selects a subset of the tags 308a that are associated with the largest number of the example tagged images 306. For example, the asset management application 200 may generate or otherwise obtain a histogram indicating, for each tag 308a in a set of example tagged images 306, how many of the tagged images 306 include the tag. The asset management application 200 may use the histogram to select the top ten tags 308a based on how many of the example tagged images 306 are associated with the selected tags 308a. In additional or alternative embodiments, the asset management application 200 selects a subset of example tagged images 306 that are most semantically similar to the input image 304 and selects a subset of tags 308a that are most frequently associated with the images in the selected subset of example tagged images 306.

Figure 6:
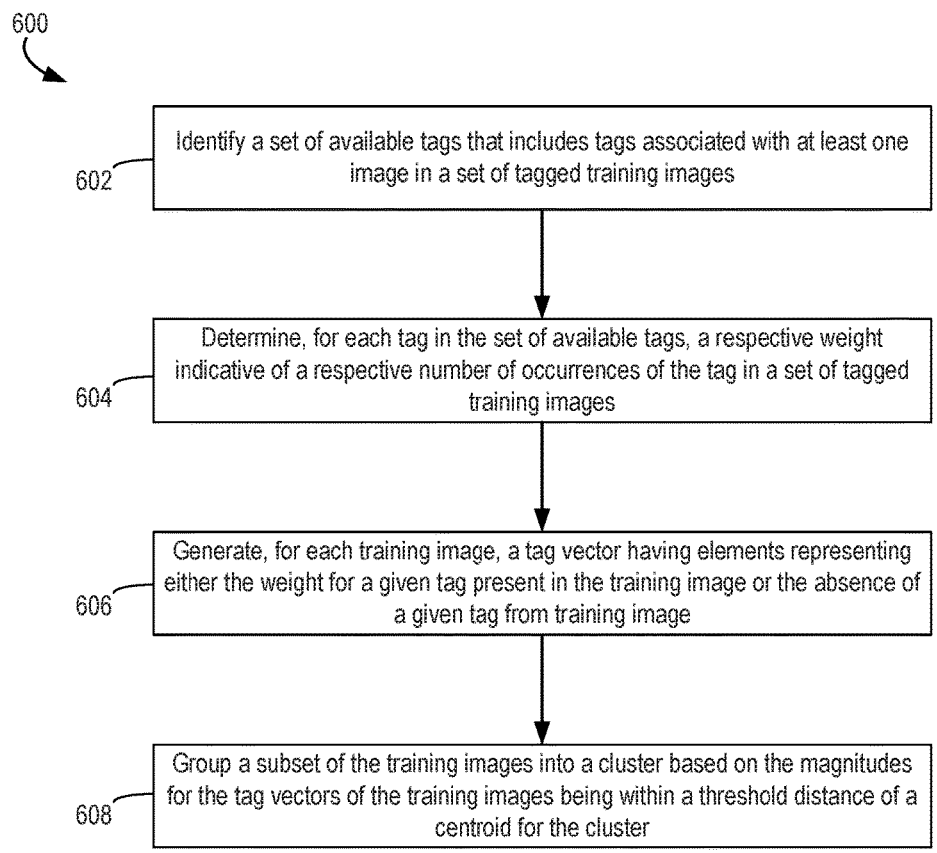
FIG. 6 is a flow chart depicting an example of a process for clustering training images used to train a classifier algorithm according to certain exemplary embodiments.

Any suitable process can be used to group the training images 204a, 204b into the clusters 202a, 202b. For example, FIG. 6 is a flow chart depicting an example of a process 600 for clustering training images 204a, 204b used to train a classifier algorithm 208. For illustrative purposes, the process 600 is described with reference to the implementation depicted in FIGS. 2-5. Other implementations, however, are possible.

The process 600 involves identifying a set of available tags for a set of tagged training images, as depicted in block 602. For example, the asset management application 200 may be executed by a suitable processing device to identify each tag in a set of tagged training images. The asset management application 200 can generate or modify data stored in a non-transitory computer-readable medium that identifies the set of available tags. The set of available tags includes any tags that are associated with at least one image from the set of tagged training images.

In some embodiments, the asset management application 200 processes content from tags associated with a set of tagged training images to identify relevant portions of tags to be included in the set of available tags. For example, the asset management application 200 may perform one or more operations that include stemming the tag content, removing irrelevant words from the tag content, tokenizing the tag content, and determining n-grams for the tag content. Each unique instance of processed tag content may be added to the set of available tags.

The process 600 involves identifying, for each tag associated with the set of available training images, a respective weight indicating a respective frequency with which the tag occurs in the set of available training images, as depicted in block 604. For example, the asset management application 200 may be executed by a suitable processing device to determine and assign weights to different tags in a set of tags.

Figure 7:
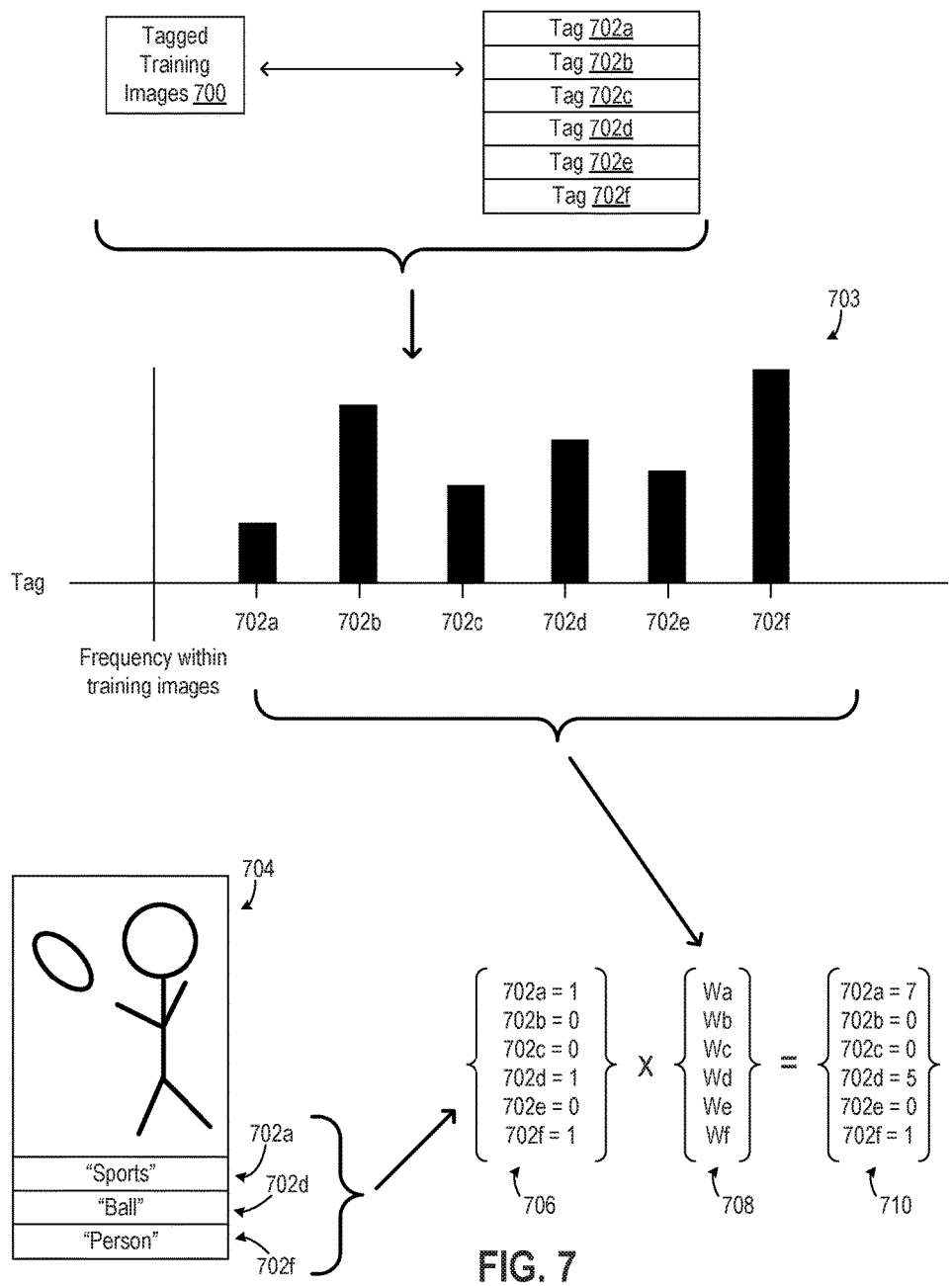
FIG. 7 is a diagram depicting the generation of tag vectors for clustering training images using the process depicted in FIG. 6 according to certain exemplary embodiments.

In some embodiments, the asset management application 200 generates a histogram or other data set that is used to identify the frequency with which certain tags are used in a set of training images. For example, FIG. 7 depicts an example set of tagged training images 700, which may include the training images 204a, 204b depicted in FIG. 2. The training images 700 can include any number of training images, each of which can be associated with any number of tags. In the simplified example depicted in FIG. 7, the set of training images 700 is associated with a set of seven tags 702a-f.

Different subsets of the available tags 702a-f may be applied to or otherwise associated with different training images. The frequency with which each of the tags 702a-f is applied to or associated with the training images 700 is depicted in the histogram 703. As depicted in FIG. 7, the tags 702b, 702d, 702f are applied to or associated with a larger number of the training images 700 as compared to the tags 702a, 702c, 702e.

In some embodiments, a weight that is associated with a given tag may be inversely proportional to its frequency. For example, if a tag occurs more frequently in a set of images (e.g., the tag "animal" being applied to each image of a dog), that tag is less likely to convey information that is specific to any given image or set of images. If a tag occurs less frequently (e.g., the tag "playing poker" being applied to a subset of the images of dogs), that tag is more likely to convey information that is specific to a given image or set of images.

In some embodiments, the source of a given tag may be used in assigning a weight to the tag. For example, the training images 204a, 204b may include a first set of tags that were associated with the training images 204a, 204b when the asset management application 200 downloaded or otherwise accessed the training images 204a, 204b from a publicly accessible source (e.g., an online image-sharing service). The training images 204a, 204b may also include a second set of tags that were applied to the training images 204a, 204b by users of the asset management application 200 after the asset management application 200 downloaded or otherwise accessed the training images 204a, 204b from the publicly accessible source. The tags added by users of the asset management application 200 may have a higher relevance for input images 304 received by the asset management application 200. For example, if one or more artists from a design company uses the asset management application 200 to apply tags to the training images after downloading the training images, these user-provided tags may have more relevance to the type of tags used by the design company as compared to tags applied to the training images by third parties via the online image-sharing service from which the training images were obtained. For this reason, the asset management application 200 may assign a greater weight to user-provided tags.

In additional or alternative aspects, other user inputs received by the asset management application 200 may be used to modify weights assigned to different tags. For example, the asset management application 200 may generate logs or other data describing which of the tags 206a, 206b have historically been selected by users to generate tagged images 310. If a given tag has been selected a threshold number of times in the past, the weight of the tag may be increased by the asset management application 200. If the tag has been selected less than the threshold number of times, the weight of the tag may be decreased by the asset management application 200.

Returning to FIG. 6, the process 600 also involves generating, for each training image, a tag vector having elements representing either the weight for a given tag present in the training image or the absence of a given tag from training image, as depicted in block 606. The asset management application 200 may be executed by a suitable processing device to generate the tag vectors for the training images 204a, 204b.

An example of generating a tag vector is depicted in FIG. 7. In this example, a training image 704 from the set of training images 700 is associated with the tags 702a, 702d, 702f from the set of tags 702a-f. A tag vector 706 for the training image 704 has six elements, each of which has a numerical value corresponding to one of the available tags 702a-f. If a given tag is associated with the training image 704, the tag vector 706 has a non-zero value. If a given tag is absent from the metadata for the training image 704, the tag vector 706 has a zero value. Thus, the tag vector 706 includes values of 1 for the tags 702a, 702d, 702f and values of 0 for the tags 702b, 702c, 702e.

The asset management application 200 uses weights associated with the tags to generate a weighted tag vector 710. In the example depicted in FIG. 7, the tags 702a-f are respectively associated with the weights Wa, Wb, Wc, Wd, and We. For example, the tag 702a has a weight of 7 indicating a lower frequency within the training images 700, the tag 702d has a weight of 5 indicating an intermediate frequency within the training images 700, and the tag 702f has a weight of 1 indicating a higher frequency within the training images 700. To generate the weighted tag vector 710, the asset management application 200 can multiply the element values in the vector 706 by their corresponding weights in the vector 708. Thus, the weighted tag vector 710 includes elements with the computed weight values for the tags 702a, 702d, 702f, which indicate that those tags are associated with the training image 704, and elements with zero values for the remaining tags, which indicate that those tags are not associated with the training image 704.

The weights for different tags can be generated using any suitable process. For example, an inverse document frequency idf can be determined from the frequency with which a given tag $u_i$, which is included in an available tag set $U = \{u_1, u_2 \ldots u_M\}$ having M tags, occurs within a set of n training images in the image set $I = \{I_1, I_2, \ldots I_n\}$. The inverse document frequency $idf_i$ for a tag $u_i$ in a set of n training images may be determined using the following formula:

$$idf_i = \frac{n}{\text{occurence of } u_i}.$$

In some embodiments, the document frequency $idf_i$ may be used for the weight of a given tag $u_i$.

In additional or alternative embodiments, a weight for a given tag $u_i$ may be standardized for a given image. For example, a given image $I_i$ may have a total number $m_i$ of tags. The number $m_i$ of tags can be used to normalize weights for images with varying numbers of tags. For example, if a tag $u_j$ from available tag set U is associated with an image $I_i$ having $m_i$ tags, a weight $x_j^i$ of tag $u_j$ with respect to the image $I_i$ may be calculated using the following formula.

$$x_j^i = \frac{idf_j}{m_i}.$$

If the tag $u_j$ is not associated with the image the weight $x_j^i = 0$.

Returning to FIG. 6, the process 600 also involves grouping a subset of the training images into a cluster based on the magnitudes for the tag vectors of the training images being within a threshold distance of a centroid for the cluster, as depicted in block 608. For example, the asset management application 200 may be executed by a suitable processing device to group the training images 204a, 204b based on the tag vectors 710 generated at block 606.

Figure 8:
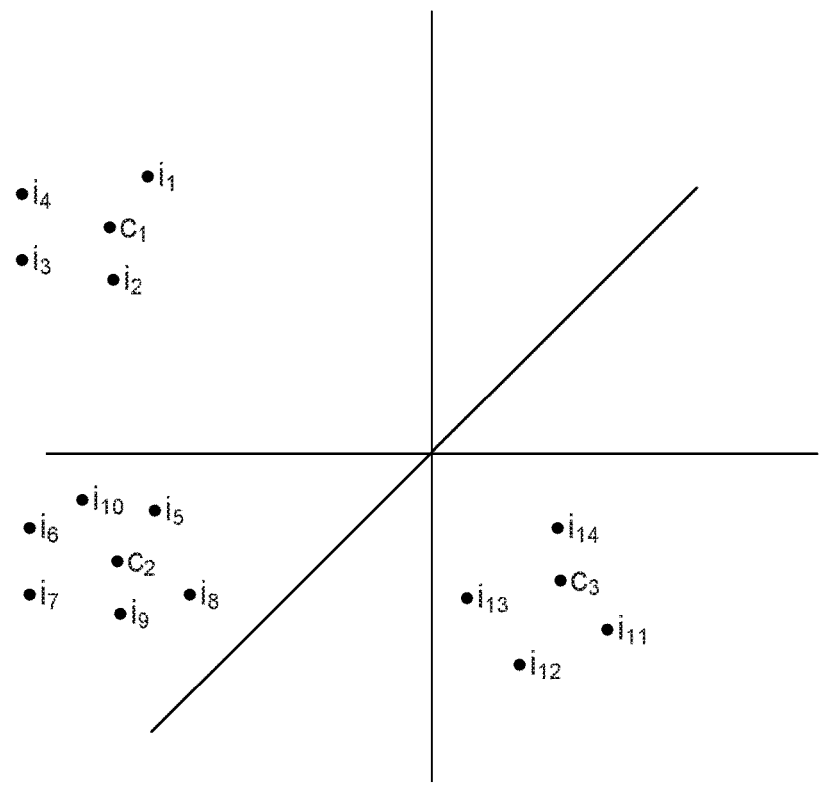
FIG. 8 is a diagram depicting an M-dimensional space defined by the tag vectors that is used to cluster training images in the process depicted in FIG. 5 according to certain exemplary embodiments.

In some embodiments, the M-dimensional tag vectors 710 generated in block 606 represent points in an M-dimensional space. A simplified example of such an M-dimensional space is depicted in FIG. 8. In this example, a set of fourteen three-dimensional tag vectors is generated for fourteen images. These tag vectors respectively define the points $i_1$-$i_{14}$ in the three-dimensional space depicted in FIG. 8. Thus, each of the points $i_1$-$i_{14}$ represents a given image's tags.

In some embodiments, the asset management application 200 clusters training images using the centroids $c_1$, $c_2$, and $c_3$ in the three-dimensional space. For example, a first cluster includes the training images corresponding to the points $i_1$-$i_4$ within a threshold distance of the centroid $c_1$. A second cluster includes the training images corresponding to the points $i_5$-$i_{10}$ within a threshold distance of the centroid $c_2$. A third cluster includes the training images corresponding to the points $i_{11}$-$i_{14}$ within a threshold distance of the centroid $c_3$.

Any number of centroids may be used by the asset management application 200. The number of centroids corresponds to the number of clusters generated by the asset management application 200. In some embodiments, the asset management application 200 receives user input that identifies a desired number of classes for the set of tagged training images. Based on the received input, the asset management application 200 selects a number of centroids for an M-dimensional space that is defined by tag vectors. The asset management application 200 uses the centroids for clustering the training images associated with the tag vectors into the desired number of classes.

In additional or alternative embodiments, the asset management application 200 selects the number of centroids (and corresponding classes of semantic content) based on the number of tagged training images and the processing resources available to the asset management application 200. For example, the asset management application 200 may determine that the available processing resources are suitable for performing a neural network classifier algorithm 208 on clusters of training images that have less than a threshold number of training images. The asset management application 200 selects a number of centroids that will cluster the set of tagged training images into clusters, with each cluster having less than the threshold number of images.

In some embodiments, the tags 206a, 206b may be modified by one or more users of the asset management application 200. For example, the asset management application 200 may receive input identifying new tags to be applied to one or more of the training images 204a, 204b, deleting some of the tags 206a, 206b, changing the content of the tags 206a, 206b, or some combination thereof. In some embodiments, the asset management application 200 executes the process 600 in response to receiving input that modifies the tags 206a, 206b. Executing the process 600 in response to changes in the tags 206a, 206b may ensure that the clusters 202a, 202b accurately reflect the available tags. In other embodiments, the asset management application 200 may periodically execute the process 600 to account for changes in the tags 206a, 206b caused by user input.

Figure 9:
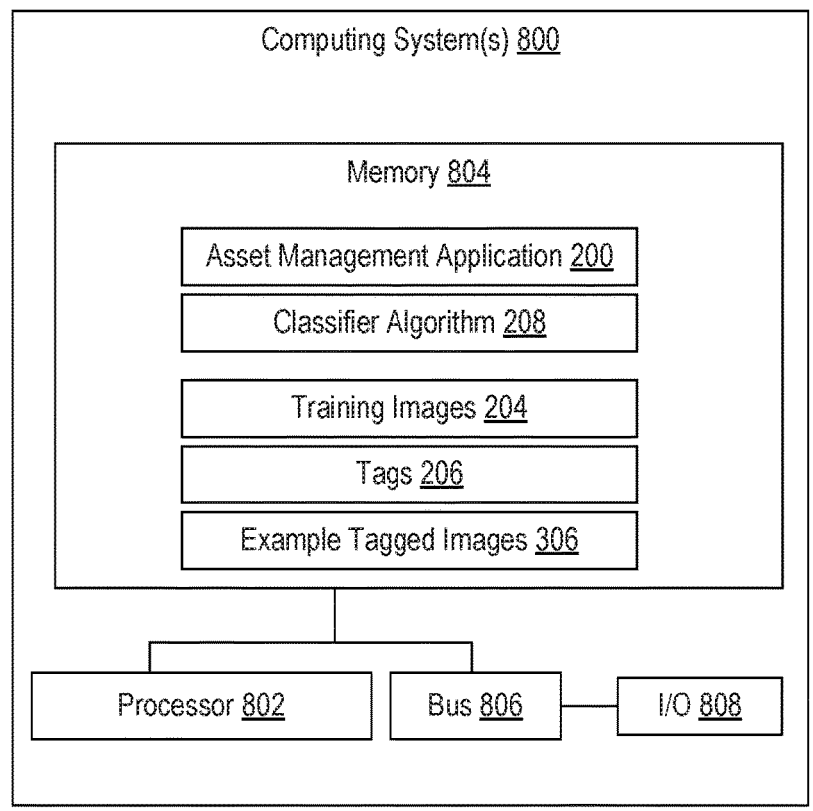
FIG. 9 is a block diagram depicting an example of a computing system that executes an asset management application for automatically selecting tags to be applied to image content based on semantic content of an input image according to certain exemplary embodiments.

Any suitable computing system or group of computing systems can be used for selecting tags to be applied to image content based on semantic content of an input image. FIG. 9 is a block diagram depicting an example of a computing system 800 that executes the asset management application 200 for automatically selecting tags based on the semantic content of an input image 304.

The computing system 800 can include a processor 802 that is communicatively coupled to a memory 804 and that executes computer-executable program code and/or accesses information stored in the memory 804. The processor 802 may comprise a microprocessor, an application-specific integrated circuit ("ASIC"), a field-programmable gate array ("FPGA"), or other processing device. The processor 802 can include any number of processing devices, including one. Such a processing device can include or may be in communication with the memory 804, which stores instructions that cause the processor 802 to perform the operations described herein when the instructions are executed by the processor 802.

The memory 804 can include any suitable computer-readable medium. The computer-readable medium can include any electronic, optical, magnetic, or other storage device capable of providing a processor with computer-readable instructions or other program code. Non-limiting examples of a computer-readable medium include a CD-ROM, a DVD, a magnetic disk, a memory chip, a ROM, a RAM, an ASIC, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing system 800 may also include a number of external or internal devices such as input or output devices. For example, the computing system 800 is shown with an input/output ("I/O") interface 808 that can receive input from input devices or provide output to output devices. A bus 806 can also be included in the computing system 800. The bus 806 can communicatively couple one or more components of the computing system 800.

The computing system 800 can execute program code that configures the processor 802 to perform one or more of the operations described above with respect to FIGS. 2-8. The program code can include, for example, the asset management application 200 or other suitable applications that may use a trained classifier algorithm 208 to match images for an automatic tagging process. The program code may be resident in the memory 804 or any suitable computer-readable medium and may be executed by the processor 802 or any other suitable processor. In some embodiments, the training images 204a, 204b, the tags 206a, 206b, and the example tagged images 306 can be stored in the memory 804, as depicted in FIG. 9. In other embodiments, one or more of the training images 204a, 204b, the tags 206a, 206b, and the example tagged images 306 can be stored in one or more memory devices accessible via a data network, such as a memory device accessible via a cloud service.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for training a classifier algorithm used for automatically generating tags to be applied to a received image, the method comprising:
grouping, by a processor, first training images together based on the first training images having tags with similar rates of occurrence within a set of tagged training images that includes the first training images and second training images;
training, by the processor, a classifier algorithm to identify, based on the first training images being grouped together, the first training images as semantically similar to one another and semantically different from the second training images;
executing the trained classifier algorithm to determine that an input image is semantically similar to an example tagged image; and
generating a tag for the input image using tag content from the example tagged image based on determining that the input image is semantically similar to the example tagged image.

2. The method of claim 1, wherein the first training images are grouped into a cluster and wherein training the classifier algorithm comprises executing a neural network classification algorithm with inputs including the first training images in the cluster and excluding the second training images that are not grouped into the cluster.

3. The method of claim 1, further comprising determining that the first training images have tags with similar content by performing operations comprising:
identifying, for each first training image, at least one respective tag; and
determining that at least a portion of each respective tag in the first training image is identical to portions of tags associated with other images in the first training images.

4. The method of claim 1, wherein the first training images are grouped into a cluster by performing operations comprising:
determining, for each tag in a set of available tags, a respective weight indicative of a respective number of occurrences of the tag in the set of tagged training images;
determining, for each first training image, a respective set of weights indicating which tags from the set of available tags are applied to the first training image;
grouping the first training images into the cluster based on the grouped training images having respective sets of weights that are sufficiently similar.

5. The method of claim 4, wherein determining the respective set of weights for each first training image comprises:
identifying a number of tags in the first training image;
computing, for each tag from the set of available tags that is associated with the first training image, a respective weight based on (i) the number of tags in the first training image and (ii) the respective number of occurrences of the tag in the set of tagged training images;
assigning the computed weights to a first subset of weights that represent tags from the set of available tags that are associated with the first training image;
assigning zero values to a second subset of weights that represent tags from the set of available tags that are not associated with the first training image; and
combining the first subset of weights and the second subset of weights into the respective subset of weights.

6. The method of claim 5, wherein the respective set of weights is a tag vector.

7. The method of claim 5, wherein determining at least one weight for at least one tag comprises:
determining that the at least one tag has been previously selected for application to a previous input image; and
increasing the at least one weight based on determining that the at least one tag has been previously selected for the previous input image.

8. The method of claim 1, wherein each tag for a training image comprises metadata identifying at least one of:
a description of subject matter depicted in the training image;
an author or editor of the training image;
a time period associated with the training image;
an image style; and
a location depicted in or associated with the training image.

9. A method for automatically generating tags to be applied to a received image, the method comprising:
accessing, by a processor, a classifier algorithm, wherein the classifier algorithm is trained to identify images as semantically similar to one another based on a set of similar training images being grouped into a cluster, wherein the set of similar training images are grouped into the cluster based on training images in the set of similar training images having respective tag vectors with respective magnitudes within a threshold distance of a centroid for the cluster, each tag vector having elements with respective values representing at least one of (i) a weight of a corresponding tag from a set of available tags or (ii) the corresponding tag being absent from a training image to which the tag vector is applied, each weight indicative of a respective number of occurrences of the corresponding tag in a set of tagged training images;
executing, by the processor, the classifier algorithm to determine that an input image is semantically similar to an example tagged image; and
generating, by the processor, a tag for the input image using tag content from the example tagged image based on determining that the input image is semantically similar to the example tagged image.

10. The method of claim 9, wherein the classifier algorithm is trained with a neural network classification having inputs including the set of similar training images in the cluster and excluding other training images from the set of similar training images that are not grouped into the cluster.

11. The method of claim 9, wherein each tag comprises metadata identifying at least one of:
a description of subject matter depicted in the training image;
an author or editor of the training image;
a time period associated with the training image;
an image style; and
a location depicted in or associated with the training image.

12. A system comprising:
a processor; and
a non-transitory computer-readable medium communicatively coupled to the processor,
wherein the processor is configured to execute program code stored in the non-transitory computer-readable medium and thereby perform operations comprising:
grouping first training images together based on the first training images having tags with similar rates of occurrence within a set of tagged training images that includes the first training images and second training images;

training a classifier algorithm to identify, based on the first training images being grouped together, the first training images as semantically similar to one another and semantically different from the second training images;

executing the trained classifier algorithm to determine that an input image is semantically similar to an example tagged image; and generating a tag for the input image using tag content from the example tagged image based on determining that the input image is semantically similar to the example tagged image.

13. The system of claim 12, wherein the first training images are grouped into a cluster and wherein training the classifier algorithm comprises executing a neural network classification algorithm with inputs including the first training images in the cluster and excluding the second training images that are not grouped into the cluster.

14. The system of claim 12, the operations further comprising determining that the first training images have tags with similar content by performing operations comprising:

identifying, for each first training image, at least one respective tag; and determining that at least a portion of each respective tag in the first training image is identical to portions of tags associated with the other first training images.

15. The system of claim 12, wherein the first training images are grouped into a cluster by performing additional operations comprising:

determining, for each tag in a set of available tags, a respective weight indicative of a respective number of occurrences of the tag in the set of tagged training images;

determining, for each first training image, a respective set of weights indicating which tags from the set of available tags are applied to the training image;

grouping the first training images into the cluster based on the grouped training images having respective sets of weights that are sufficiently similar.

16. The system of claim 15, wherein the respective set of weights is a tag vector.

17. The system of claim 15, wherein determining the respective set of weights for each first training image comprises:

identifying a number of tags in the first training image;

computing, for each tag from the set of available tags that is associated with the first training image, a respective weight based on (i) the number of tags in the first training image and (ii) the respective number of occurrences of the tag in the set of tagged training images;

assigning the computed weights to a first subset of weights that represent tags from the set of available tags that are associated with the first training image;

assigning zero values to a second subset of weights that represent tags from the set of available tags that are not associated with the first training image; and combining the first subset of weights and the second subset of weights into the respective subset of weights.

18. The system of claim 15, wherein determining at least one weight for at least one tag comprises:

determining that the at least one tag has been previously selected for application to a previous input image; and increasing the at least one weight based on determining that the at least one tag has been previously selected for the previous input image.

19. The system of claim 12, wherein each tag for a training image comprises metadata identifying at least one of:

a description of subject matter depicted in the training image;

an author or editor of the training image;

a time period associated with the training image;

an image style; and a location depicted in or associated with the training image.

* * * * *